United States Patent
Finlow-Bates et al.

(10) Patent No.: US 9,161,329 B2
(45) Date of Patent: Oct. 13, 2015

(54) COMMUNICATION OF MOBILE DEVICE LOCATIONS

(71) Applicant: QUALCOMM Incorporated, San Diego, CA (US)

(72) Inventors: Keir Finlow-Bates, Kangasala (FI); Joonas Viskari, Lempäälä (FI)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 13/928,136

(22) Filed: Jun. 26, 2013

(65) Prior Publication Data
US 2015/0004996 A1   Jan. 1, 2015

(51) Int. Cl.
| | | |
|---|---|---|
| *H04W 24/00* | (2009.01) | |
| *H04M 11/04* | (2006.01) | |
| *H04M 3/42* | (2006.01) | |
| *H04W 64/00* | (2009.01) | |
| *H04W 4/02* | (2009.01) | |
| *H04W 12/06* | (2009.01) | |
| *H04W 4/20* | (2009.01) | |
| *H04L 29/06* | (2006.01) | |
| *H04W 4/00* | (2009.01) | |
| *H04L 29/08* | (2006.01) | |

(52) U.S. Cl.
CPC .............. *H04W 64/00* (2013.01); *H04W 4/02* (2013.01); *H04W 4/20* (2013.01); *H04W 12/06* (2013.01); *H04L 63/08* (2013.01); *H04L 67/02* (2013.01); *H04W 4/008* (2013.01)

(58) Field of Classification Search
CPC ......... H04W 4/02; H04W 64/00; H04W 4/20; H04W 12/12; H04W 12/06

USPC ........ 455/404.2, 456.1–456.6, 457, 410, 411, 455/414.1
See application file for complete search history.

(56) References Cited

U.S. PATENT DOCUMENTS

| | | | |
|---|---|---|---|
| 5,726,435 A | 3/1998 | Hara et al. | |
| 7,577,441 B2 | 8/2009 | Nonoyama | |
| 2006/0063536 A1* | 3/2006 | Kim et al. | 455/456.1 |
| 2006/0246919 A1* | 11/2006 | Park et al. | 455/456.1 |
| 2007/0037585 A1* | 2/2007 | Shim | 455/456.1 |
| 2007/0287411 A1 | 12/2007 | Kim et al. | |
| 2008/0123608 A1 | 5/2008 | Edge et al. | |
| 2010/0216491 A1 | 8/2010 | Winkler et al. | |
| 2010/0238048 A1* | 9/2010 | Cho et al. | 340/825.49 |
| 2011/0040626 A1* | 2/2011 | Lin | 705/14.63 |
| 2011/0105146 A1 | 5/2011 | Chandrasekaran | |
| 2012/0088518 A1* | 4/2012 | Edge | 455/456.1 |
| 2012/0142322 A1 | 6/2012 | Gomez | |
| 2012/0158297 A1 | 6/2012 | Kim et al. | |
| 2013/0107806 A1* | 5/2013 | Lee et al. | 370/328 |
| 2013/0217410 A1* | 8/2013 | Ku et al. | 455/456.1 |

OTHER PUBLICATIONS

International Search Report and Written Opinion—PCT/US2014/040678—ISA/EPO—Nov. 28, 2014.

* cited by examiner

*Primary Examiner* — Dung Hong
(74) *Attorney, Agent, or Firm* — Silicon Valley Patent Group LLP

(57) ABSTRACT

Method, apparatus, and system for communicating location of a mobile device are disclosed. In one embodiment, a method includes determining information at the mobile device from a marker associated with an object, generating a location request in accordance with the determined information, and communicating location information in response to the location request generated.

26 Claims, 8 Drawing Sheets

COMMUNICATION OF MOBILE DEVICE LOCATIONS

FIELD

The present disclosure relates to the field of wireless communication. In particular, the present disclosure relates to method, apparatus, and system for communicating mobile device locations.

BACKGROUND

The use of accurate position information of a mobile platform, such as cellular or other wireless communication devices, is becoming prevalent in the communications industry. Satellite positioning systems (SPS), such as the Global Positioning System, offer an approach to providing wireless mobile platform position determination. A SPS user can derive precise navigation information including position, velocity and time of day through information gained from satellite vehicles (SVs) in orbit around the earth. The signals that are received from the SVs are typically weak. Therefore, in order to determine the position of a mobile platform, the SPS receiver must be sufficiently sensitive to receive these weak signals and interpret the information represented by them.

Markers, such as Quick Response (QR) codes or similar, or 1D or 2D bar codes, are becoming prevalent and are increasingly available in various forms printed on merchandise, or attached to physical objects. Accordingly, it is desirable to use such markers to assist in communicating mobile device locations.

SUMMARY

The present disclosure relates to method, apparatus, and system for communicating mobile device locations. According to an embodiment of the present disclosure, a method of communicating location of a mobile device comprises determining information at the mobile device from a marker associated with an object, generating a location request in accordance with the determined information, and communicating location information in response to the location request generated.

In another embodiment of the present disclosure, a mobile device comprises a control unit including processing logic, and the processing logic comprises logic configured to determine information at the mobile device from a marker associated with an object, logic configured to generate a location request in accordance with the determined information, and logic configured to communicate location information in response to the location request generated.

In yet another embodiment of the present disclosure, a system for communicating location of a mobile device comprises means for determining information at the mobile device from a marker associated with an object, means for generating a location request in accordance with the determined information, and means for communicating location information in response to the location request generated.

In yet another embodiment of the present disclosure, a non-transitory medium storing instructions for execution by one or more computer systems, the instructions comprises instructions for determining information at the mobile device from a marker associated with an object, instructions for generating a location request in accordance with the determined information, and instructions for communicating location information in response to the location request generated.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

DESCRIPTION OF EMBODIMENTS

Embodiments of method, apparatus, and system for communicating mobile device locations are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
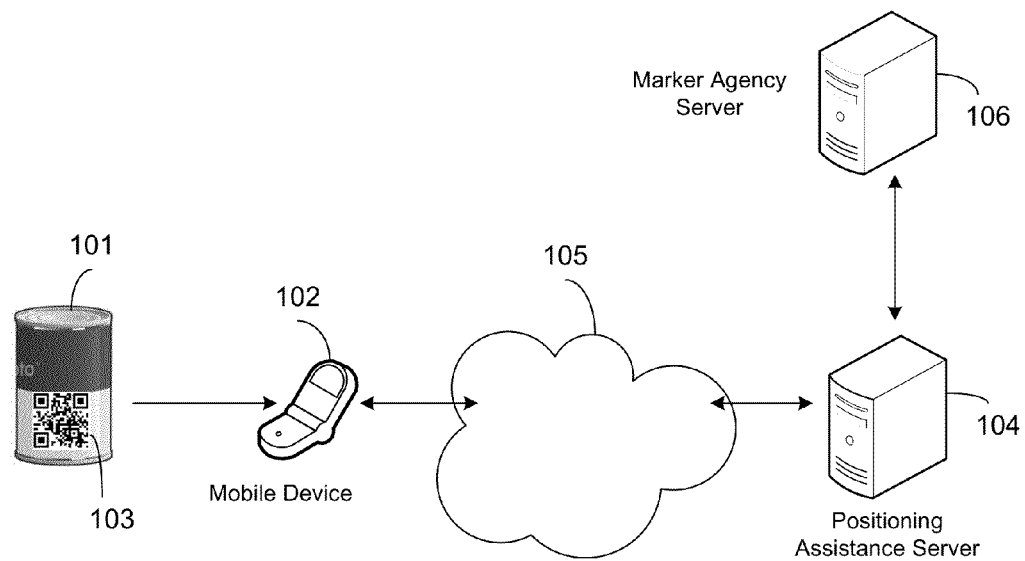
FIG. 1 illustrates a system for communicating mobile device location according to aspects of the present disclosure.

FIG. 1 illustrates a system for communicating mobile device location according to aspects of the present disclosure. As shown in FIG. 1, mobile device 102 can be configured to scan a marker 103 from object 101. Upon receiving the marker 103, which in this example is a QR code, mobile device 102 may process the marker to determine encoded data, and use the encoded data to communicate with positioning assistance server 104 via a communication network 105. The mobile device 102 may be configured to initiate a positioning procedure to communicate with the positioning assistance server 104 and/or a marker agency server 106 based at least in part on information retrieved from marker 103. The positioning assistance server 104 may be configured to provide positioning assistance based on information retrieved from market 103, and may be configured to communicate with the marker agency server 106. For simplicity of illustration, only one product 101, its associated marker 103 and marker agency server 106 are shown in FIG. 1. In other embodiments, different products, for example magazines, soda cans, etc., may include one or more different markers, and the different markers may be generated, monitored, and maintained by different marker agency servers. In some embodiments, the marker agency server 106 is coupled via a wired or wireless connection to the communication network 105 and configured to communicate over the communication network 105, for example with the positioning assistance server 104, the mobile device 102, and/or one or more other devices or entities.

According to aspects of the present disclosure, marker 103 may be attached to an object 101, such as a can of soup. The marker may also be attached to a location that is accessible to mobile device 102, such as at an entrance or directory sign to a building, or other accessible location. In some implementations, the marker 103 may be a visual object constructed with capability of data encoding and includes 1D, 2D, or 3D matrix codes, for example in a printed format. The marker 103 illustrated in FIG. 1 is in the form of a QR code, which is a matrix code created by Japanese corporation Denso-Wave. Other types of bar codes, matrix codes, or machine readable representations of data, including multi-dimensional bar codes or optical data matrix style codes, such as Data Matrix code, Semacode, Maxicode, or Aztec Code may be used if desired. These markers may be detected based on their known structural characteristics (e.g. finder patterns in QR code) and then decoded. In some other implementations, the marker 103 may be implemented in other forms, including but not limited to, one or more acoustic barcodes, radio frequency identification (RFID) tags, and near field communication (NFC) tags.

According to aspects of the present disclosure, network 105 may be a wireless network that supports GSM, WCDMA, LTE, CDMA 1xRTT, CDMA EvDO, WiFi, WiMax or some other wireless technology. Network 105 may also be a wireline network (e.g. support DSL or packet cable access). The mobile device 102, positioning assistance server 104 and marker agency server 106 may be part of network 105 or part of some other network not shown in FIG. 1, and may be capable of communicating via network 105—e.g. in order to update information such as transmission timing, transmission power, etc. When the mobile device 102 is connected to network 105, backhaul signaling and data/voice transport with the rest of network 105 may be accomplished by wireless means (e.g. microwave, satellite as well as the wireless technology supported by fixed base stations belonging to network 105). According to aspects of the present disclosure, positioning assistance server 104 may be operated by a positioning service provider, and the marker agency server 106 may be operated by a manufacturer of product 101 on which marker 103 may be attached to. In other implementations, positioning assistance server 104 and marker agency server 106 may be operated by the same business entity, and these two servers may be implemented as a single server.

Figure 2:
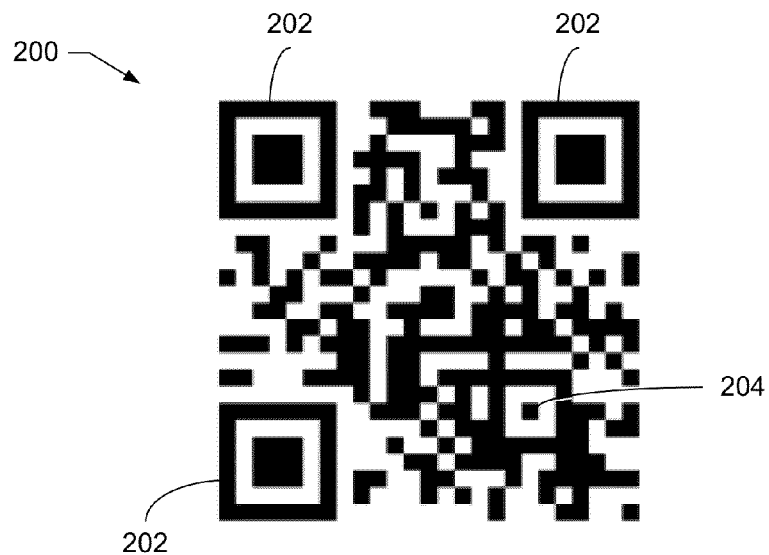
FIG. 2 illustrates a marker in the form of a QR code according to aspects of the present disclosure.

FIG. 2 illustrates a marker in the form of a QR code according to aspects of the present disclosure. In the exemplary QR code 200 shown in FIG. 2, recognizable patterns, for example large squares 202 in three corners and one or more small squares 204, are included that may be used to determine position and alignment. These patterns in the QR code are used to detect the QR code and for QR based relative positioning, i.e., determining the position and orientation (pose) of the QR reader (which may be a camera on a mobile device) with respect to the QR code. The QR code may additionally include encoded data in the form of squares (or other patterns in a different embodiment), which may include the encoded content of the QR code. The data encoded in the QR code may include an identifier configured to identify the marker (for example to a location server such as a SUPL location platform (SLP) server). In some embodiments, the QR code and/or the identifier is unique (e.g., the QR code may be different from all other QR codes, or otherwise identify that specific code), or the QR code may identify a category or set of QR codes (e.g., each can of beans has a common QR code, while each can of soup has a common QR code, but the soup QR code and the beans QR are different). The QR code may be configured to initiate or otherwise trigger a location session (e.g., a SUPL session), and/or an IP address or other address of the location server which may be used to serve the location session (e.g., the address of the SLP server to serve the SUPL session). The data encoded in the QR code may further include a URL, merchandise information, building information, and/or any other information. In some embodiments, the QR code may include a mode of the location request to use, address or server identification of a third party server (e.g., the agency server 106), or other information. Further examples are described below. The QR code may also include the location of the QR code.

Figure 3:
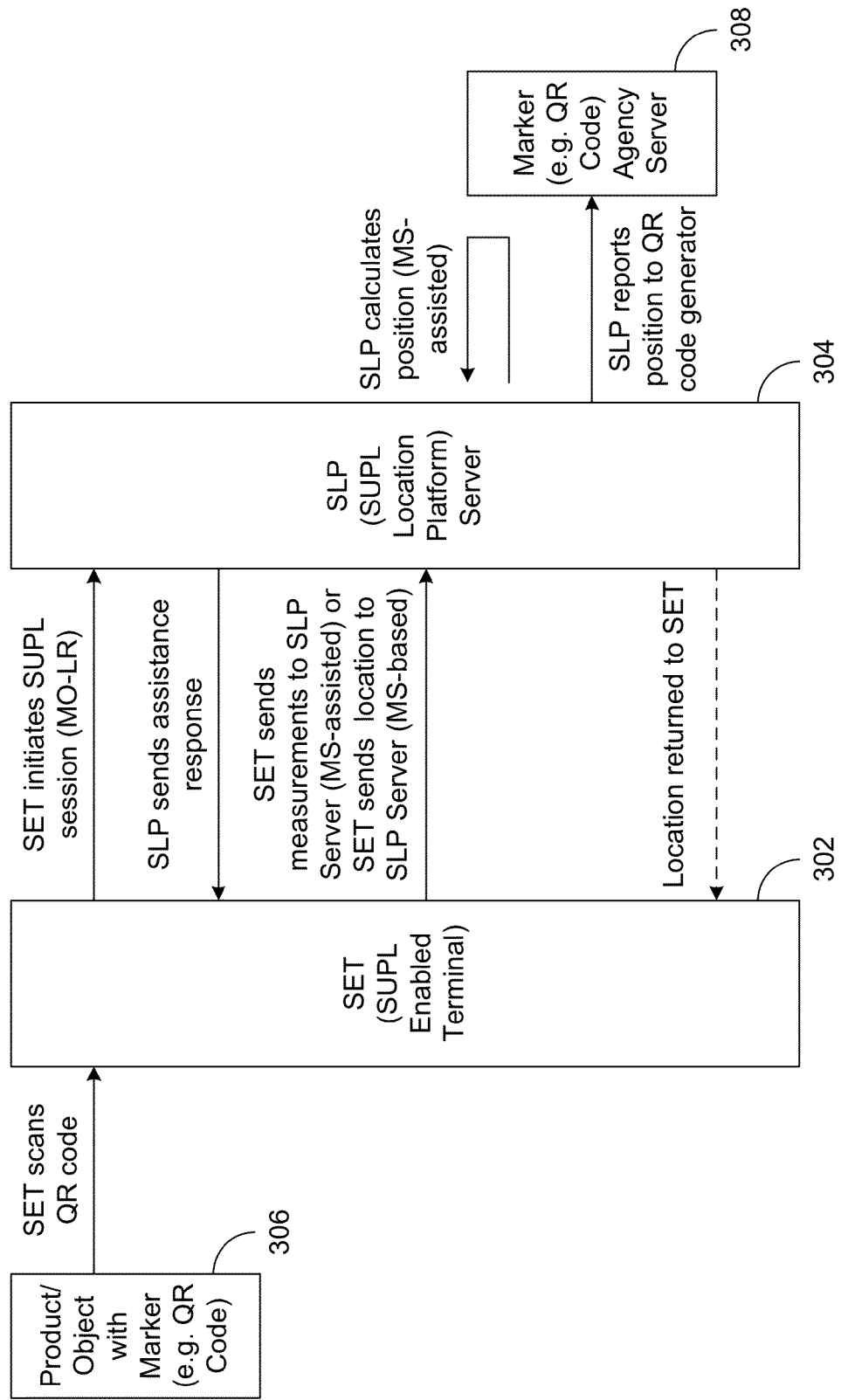
FIG. 3 illustrates a method of initiating a mobile originated location request by a secure user plane location enabled terminal according to aspects of the present disclosure.
Figure 4:
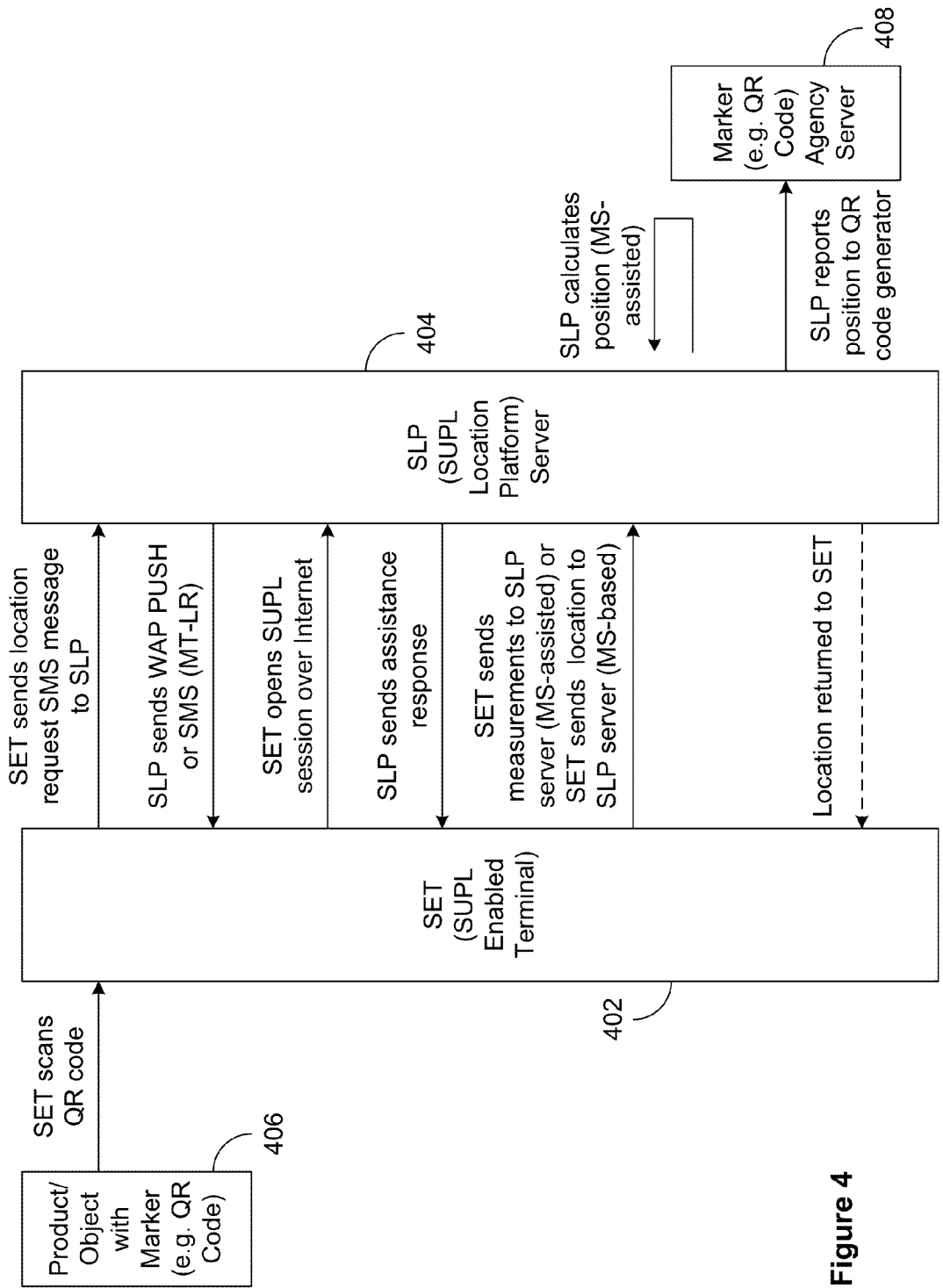
FIG. 4 illustrates a method of initiating a mobile terminated location request by a secure user plane location enabled terminal according to aspects of the present disclosure.

According to aspects of the present disclosure, the SUPL embodiments described in FIG. 3 and FIG. 4 are provided as examples. In other embodiments, other location sessions may be employed, such as RRLP (Radio resource location protocol) position protocol for GSM (Global System for Mobile) networks, RRC (radio resource control) position protocol for UMTS (Universal Mobile Telecommunications System) networks, and LTE (long-term evolution) position protocol for LTE Networks. FIG. 3 illustrates a method of initiating a mobile originated location request by a secure user plane location enabled terminal according to aspects of the present disclosure. In the example shown in FIG. 3, a secure user plane location (SUPL) enabled terminal (SET) 302 may be used to implement mobile device 102 of FIG. 1, and a SUPL Location Platform (SLP) Server 304 may be used to implement positioning assistance server 104 of FIG. 1. The SET 302 may be configured to communicate with the SLP Server 304. In this exemplary flow of operations, the SET 302 scans a marker (e.g. a QR code) printed or attached on an object 306, which triggers the SET 302 to initiate a SUPL location request.

According to aspects of the present disclosure, an API extension may be created such that when a marker such as a QR code is scanned; it causes the SET 302 to initiate a SUPL session of location request to a SLP server 304 specified in the QR code data, such as a mobile originated location request (MO-LR). The SLP server 304 may then send assistance response to the SET 302. Upon receiving the assistance response, the SET 302 may send GPS measurements or other positioning measurements to the SLP server 304. For example, other positioning measurements may be obtained with respect to WiFi access points, base stations, or other mobile devices. In some embodiments, the QR code includes a location or data which may be used to derive a location. The SET 302 may assist the determination of its location by sending the positioning measurements to the SLP server 304 (e.g., in mobile station assisted mode), or use any combinations of the positioning measurements to compute its location (in mobile station based mode). In the scenario of mobile station assisted mode, the SLP server 304 calculates the location of the SET 302. The SLP server 304 may then send the location result received from the SET 302 or the calculated location of the SET 302, and a time stamp on the location, to a third party server, for example the marker agency server 308, which can be the entity that generated the QR code. The SLP server 304 may optionally return the calculated location to the SET 302.

FIG. 4 illustrates a method of initiating a mobile terminated location request by a secure user plane location enabled terminal according to aspects of the present disclosure. In the example shown in FIG. 4, a secure user plane location (SUPL) enabled terminal (SET) 402 may be used to implement mobile device 102 of FIG. 1, and a SUPL Location Platform (SLP) Server 404 may be used to implement positioning assistance server 104 of FIG. 1. After scanning a marker (such as a QR code) from an object 406, the SET 402 can be configured to send a short message services (SMS) message that includes a location request to the SLP server 404, in situations when there is no Internet (or other network) connection. After receiving the location request from SET 402, the SLP server 404 sends an SMS INIT or WAP PUSH to SET 402 to initiate a SUPL session, such as a mobile terminated location request (MT-LR). The SET 402 may then open SUPL session with the SLP server 404 over the Internet or another network. The SLP server 404 may then send assistance response to the SET 402. The SET 402 may send GPS measurements or other positioning measurements to the SLP server 404 (in mobile station assisted mode), or send a location result to the SLP server 404 (in mobile station based mode). For example, other positioning measurements may be obtained with respect to WiFi access points, base stations, or other mobile devices. In the scenario of mobile station assisted mode, the SLP server 404 calculates the location of the SET 402. The SLP server 404 can then send the location result received from the SET 402 or the calculated location of the SET 402, and a time stamp on the location, to a third party server, for example the marker agency server 408, which can be the entity that generated the QR code. The SLP server 404 may optionally return the calculated location to the SET 402.

According to aspects of the present disclosure, the QR code (or another type of marker, according to different embodiments) may include one or more of the following: a) an ID of the QR code that can be reported back to the SLP server (to allow tracking of which QR code is being scanned); b) a code that triggers the QR code scanning software to initiate a SUPL session; c) the DNS or IP address of the SLP server to use; d) the mode of the location request to use (e.g., MO-LR or MT-LR); and/or e) the location of a third party server to whom the location may be reported.

Figure 5:
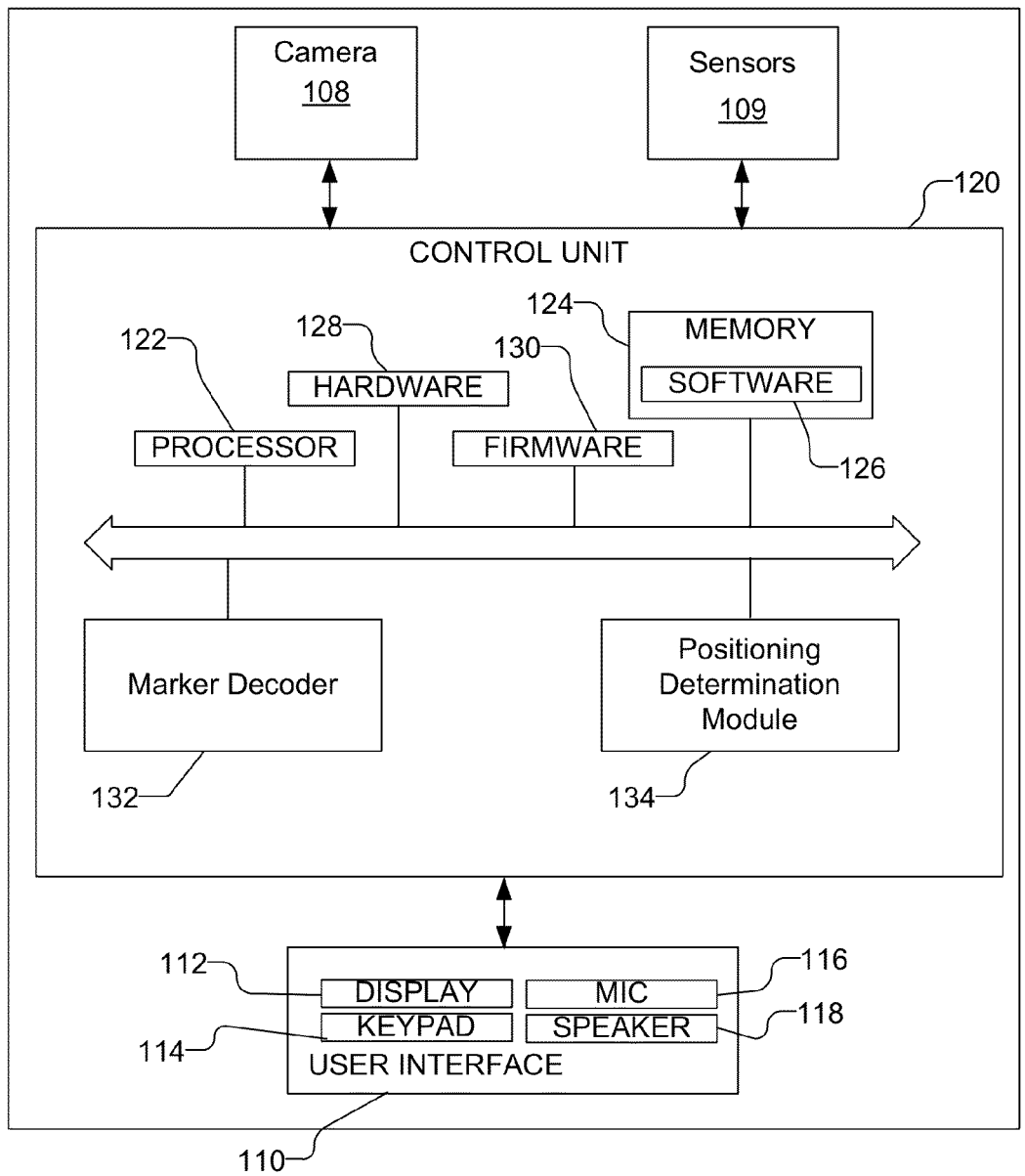
FIG. 5 illustrates an exemplary block diagram of a mobile device according to aspects of the present disclosure.

FIG. 5 illustrates an exemplary block diagram of a mobile device according to aspects of the present disclosure. As shown in FIG. 5, mobile device 500 may include a camera 108, which may be configured to capture images of the markers (e.g., marker 103), such as QR codes and bar codes. The mobile device 500 may also include sensors 109, which may be configured to receive data from RFID tags, NFC tags, and/or other types of markers. Examples of sensors that may be used with the mobile device 500 include RFID sensors, NFC sensors, accelerometers, quartz sensors, gyros, microelectromechanical system (MEMS) sensors used as linear accelerometers, microphones, as well as magnetometers. According to aspects of the present disclosure, mobile device 500 may be configured to implement mobile device 102 of FIG. 1, SET 302 of FIG. 3, SET 402 of FIG. 4, mobile device 802 of FIG. 8, and/or mobile device 902 of FIG. 9.

The mobile device 500 may also include a user interface 110 that includes display 112 capable of displaying images. The user interface 110 may also include a keypad or touch sensor(s) 114 or other input device through which the user can input information into the mobile device 500. If desired, the keypad 114 may be replaced by or included in addition to integrating a virtual keypad into the display 112 with a touch sensor. The user interface 110 may also include a microphone 116 and one or more speakers 118, for example, if the mobile device 500 is a cellular telephone. The mobile device may further include wired and/or wireless receivers and transmitters (not shown) for communicating with network 105 and other systems and/or one of more other devices, for example any of the devices illustrated or discussed herein. Of course, mobile device 500 may include other components unrelated to the present disclosure.

The mobile device 500 further includes a control unit 120 that is connected to and communicates with the camera 108 and/or sensors 109, as well as the user interface 110, along with any other desired features. The control unit 120 may be provided by one or more processors 122 and associated memory/storage 124. The control unit 120 may also include software 126, as well as hardware 128, and firmware 130. The control unit 120 includes a marker decoder module 132 configured to decode/determine information obtained from a marker, for example the marker 103. The control unit 120 further includes a positioning determination module 134 configured to assist the determination of the mobile device location. The marker decoder module 132 and positioning determination module 134 are illustrated separately from elements 122-130 for clarity, but may be combined and/or implemented in any one or more of the elements 122-130, for example based on instructions in the software 126 and/or the firmware 130. Note that control unit 120 can be configured to implement methods of communicating mobile device locations. In some implementations, the control unit 120 can be configured to implement functions of the mobile device 102 described in FIG. 1, or the SET 302 and 402 described in FIG. 3 and FIG. 4, respectively. For the example shown in FIG. 3, the control unit 120 and wired/wireless transmitter (not shown) may be configured to initiate SUPL session (MO-LR) and to send measurements (in MS-assisted mode) or location (in MS-based mode) from SET 302 to SLP server 304. The control unit 120 and wired/wireless receiver (not shown) may be configured to receive assistance response or optionally to receive location returned from SLP server 304 to SET 302. Similarly for the example shown in FIG. 4, the control unit 120 and wired/wireless transmitter (not shown) may be configured to send location request SMS message(s), to send measurements (in MS-assisted mode), or to send location (in MS-based mode) from SET 402 to SLP server 404. The control unit 120 and wired/wireless receiver (not shown) may be configured to receive WAP Push or SMS (in MT-LR mode), to receive assistance response, and optionally to receive location returned from SLP server 404 to SET 402.

Figure 6:
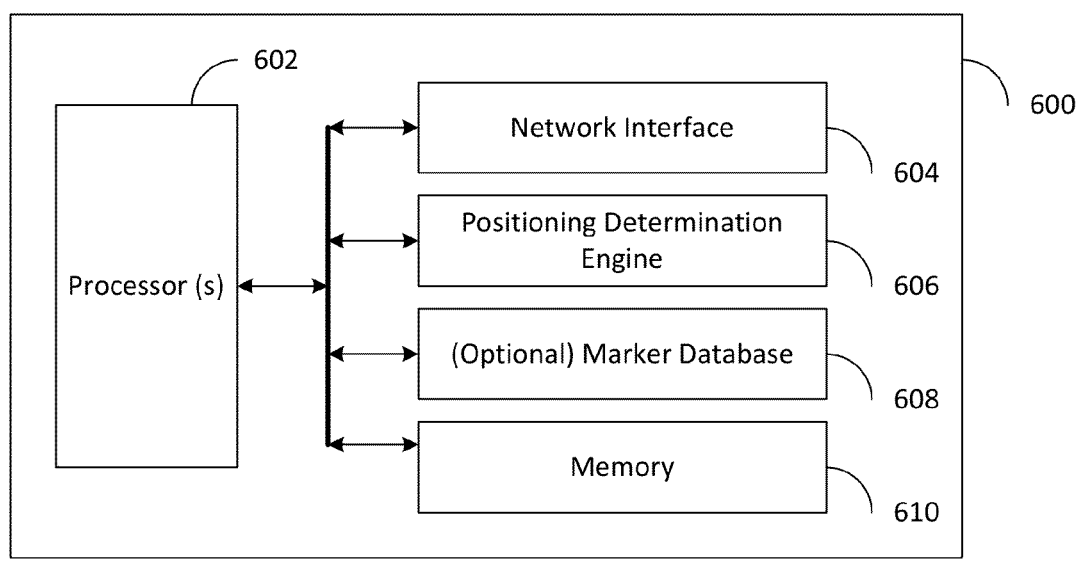
FIG. 6 illustrates a block diagram of a server for assisting determination of mobile device location according to aspects of the present disclosure.

FIG. 6 illustrates a block diagram of a server for assisting determination of mobile device location according to aspects of the present disclosure. As shown in FIG. 6, server 600 includes one or more processors 602, network interface 604, positioning determination engine 606, optional marker database 608, and memory 610. According to aspects of the present disclosure, server 600 may be configured to implement position assistance server 104 of FIG. 1, SLP server 304 of FIG. 3, SLP server 404 of FIG. 4, targeted marketing server 804 of FIG. 8, and/or Security authentication server 904 of FIG. 9. The one or more processors 602 can be configured to control operations of the server 600. The network interface 604 can be configured to communicate with a network (for example network 105), which may be configured to communicate with other servers, computers, and mobile devices. The positioning determination engine 606 can be configured to implement methods of assisting determination of mobile device location. For example, the positioning determination engine 606 can be configured to implement functions of the positioning assistance server 104 described in FIG. 1, or the SLP server 304 and 404 described in FIG. 3 and FIG. 4, respectively. For the example shown in FIG. 3, processor 602 and network interface 604 may be configured to receive SET initiated SUPL session (in MO-LR mode) and to receive measures (in MS-assisted mode) and location (in MS-based mode) sent from SET 302. Processor 602 and network interface 604 may be configured to send assistance response, and to optionally send determined location information to SET 302. Similarly for the example shown in FIG. 4, processor 602 and network interface 604 may be configured to receive location request SMS message(s), measurements (in MS-assisted mode), and location (in MS-based mode) sent from SET 402. Processor 602 and network interface 604 may be configured to send WAP Push or SMS (in MT-LR mode), to send assistance response, and to optionally send determined location information to SET 402. The optional marker database 608 can be configured to store markers generated by different agencies. The memory 610 can be configured to store program codes, instructions and data for the server 600. In some embodiments, one or more of the elements illustrated in FIG. 6 may be combined or separated into additional components or elements. For example, the positioning determination engine 606 and/or the marker database may be partially or wholly implemented in the processor 602 and/or the memory 610.

Figure 7:
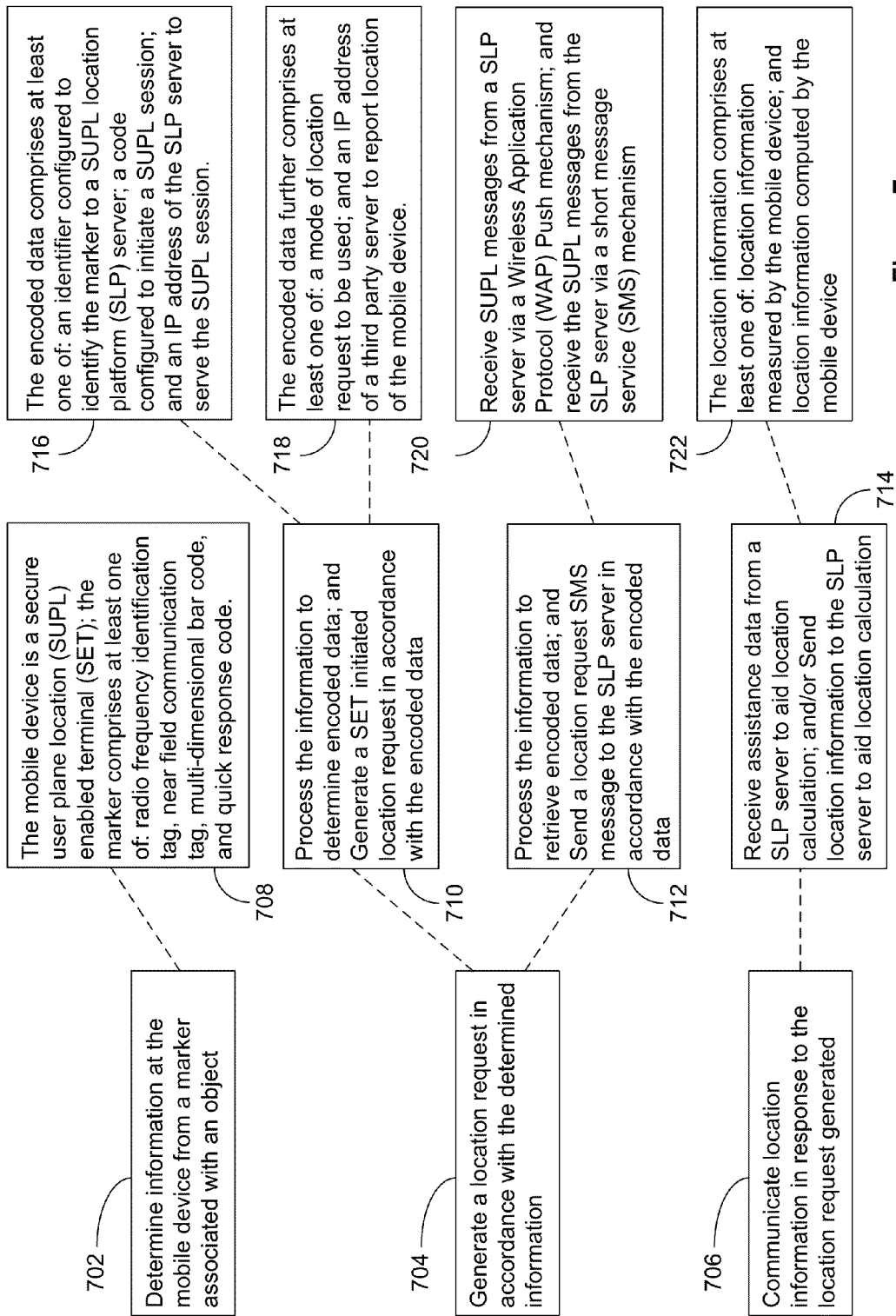
FIG. 7 illustrates a flow diagram of communicating location of a mobile device according to aspects of the present disclosure.

FIG. 7 illustrates a flow diagram of communicating location of a mobile device according to aspects of the present disclosure. According to some aspects of the present disclosure, the functions described in FIG. 7 may be implemented by the control unit 120 of FIG. 5. In some implementations, the functions may be performed by processor 122, software 126, hardware 128, and/or firmware 130, or a combination of these blocks to perform various functions of the mobile device described above, including the functions performed by marker decoder module 132 and the positioning determination module 134.

In block 702, the control unit 120 can be configured to determine information at the mobile device from a marker (e.g., maker 103) associated with an object, for example using the camera 108 and/or one or more other sensors 109, 110. In block 704, the control unit 120 can be configured to generate a location request in accordance with the determined information, for example the session initiation or location request illustrated in FIG. 3 and/or FIG. 4. In block 706, the control unit 120 can be configured to communicate location information in response to the location request generated. For example, the control unit 120 may be configured to send measurements to a SLP server (in MS-assisted mode) or to send location information to the SLP server (in MS-based mode). As shown in block 708, the mobile device may comprise a secure user plane location (SUPL) enabled terminal (SET); and the marker may comprise at least one of: radio frequency identification tag, near field communication tag, multi-dimensional bar code, and quick response code.

The methods performed in block 704 may include methods performed in blocks 710 and 712. The methods performed in block 710 may further include features described in block 716 and 718; and the methods performed in block 712 may further include the method performed in block 720.

In block 710, the control unit 120 can be configured to process the information to determine encoded data, and generate a SET initiated location request in accordance with the encoded data. In block 716, the encoded data may comprise at least one of: an identifier configured to identify the marker to a SUPL location platform (SLP) server; a code configured to initiate a SUPL session; and an IP address of the SLP server to serve the SUPL session. In block 718, the encoded data may further comprise at least one of: a mode of location request to be used; and an IP address of a third party server to report location of the mobile device to.

In block 712, the control unit 120 can be configured to process the information to retrieve encoded data, and send a location request SMS message to a SLP server in accordance with the encoded data. In block 720, the control unit 120 can be configured to receive SUPL messages from the SLP server via a Wireless Application Protocol (WAP) Push mechanism, and/or receive the SUPL messages from the SLP server via a short message service (SMS) mechanism.

The methods performed in block 706 may include methods performed in blocks 714, which may further includes features described in block 722. In block 714, the control unit 120 can be configured to receive assistance data from a SLP server to aid location calculation; and/or send location information to the SLP server to aid location calculation. In block 722, the location information may comprise at least one of: location information measured by the mobile device; and location information computed by the mobile device.

According to aspects of the present disclosure, the control unit 120 can be configured to receive targeted advertisements in response to a location of the mobile device obtained based at least in part on the location information. In addition or in the alternative, the control unit 120 can be configured to send an authentication request to a security authentication server in response to a determined location of the mobile device, and receive an authentication response from the security authentication server.

Figure 8:
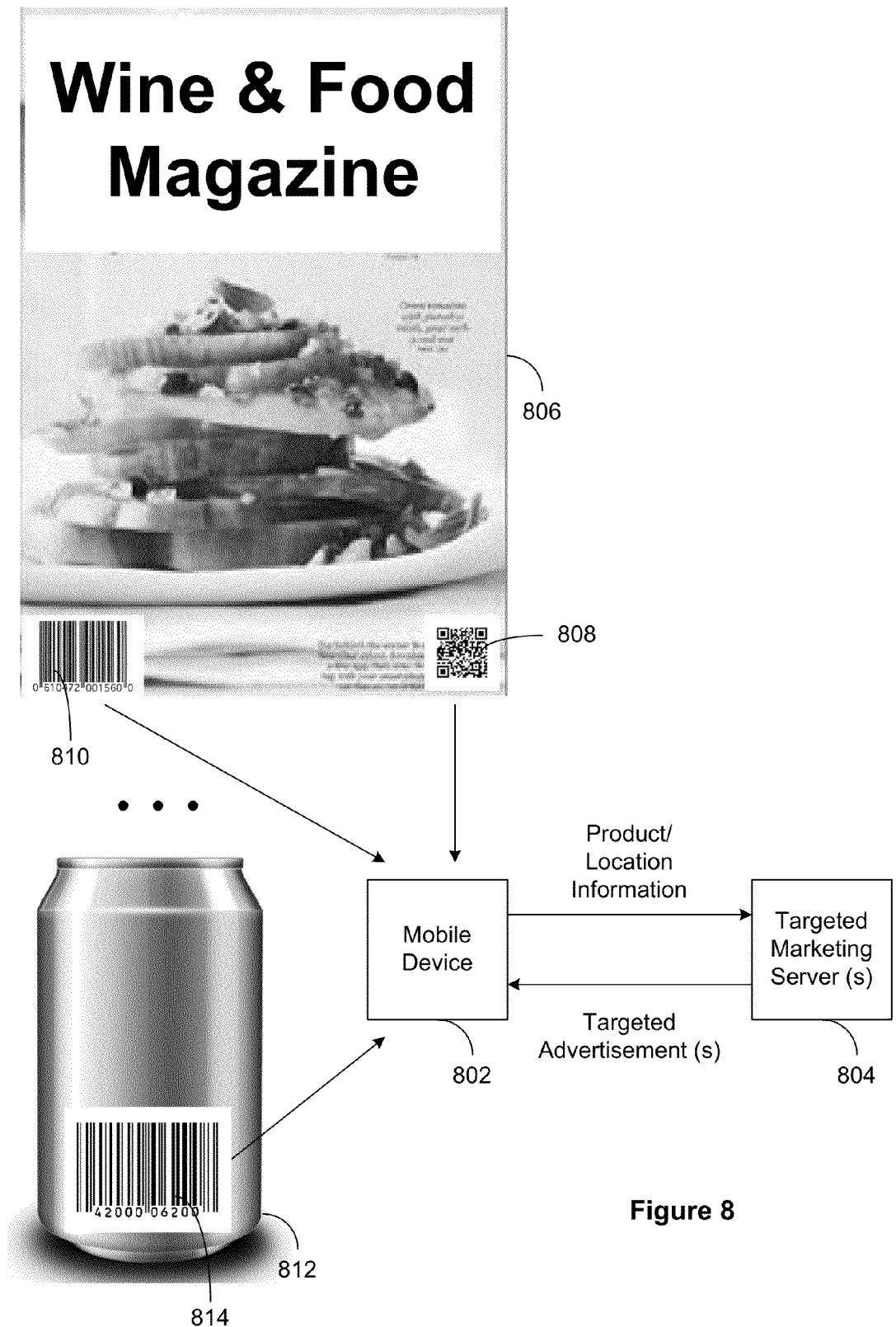
FIG. 8 illustrates a method of communicating targeted marketing messages according to aspects of the present disclosure.

FIG. 8 illustrates a method of communicating targeted marketing messages according to aspects of the present disclosure. In the exemplary application shown in FIG. 8, mobile device 802 may be configured to scan markers from different objects, such as markers 808 and 810 from magazine 806, and marker 814 from soda can 812. Similar to the example shown in FIG. 1, mobile device 802 may be configured to perform similar functions as mobile device 102 in a targeted marketing application; markers 808, 810, and 814 show different representations of marker 103 in such embodiments; and targeted marketing server 804 may be configured to function as the positioning assistance server 104 and/or the marker agency server 106 of FIG. 1, as the SLP server 304 and/or the marker agency server 308 of FIG. 3, or as the SLP server 404 and/or the marker agency server 408 of FIG. 4. Upon determining the location of the mobile device 802 using the methods described above in association with FIG. 3 and/or FIG. 4, a targeted marketing server 804 may send targeted advertisements to the mobile device 802.

In the example shown in FIG. 8, the disclosed approach may be applied to enable an advertiser to obtain the location of a user and, in some embodiments, the time when a marker (such as a QR code) is scanned, which may then be used to gather information for consumer behavior analysis. In some implementations, the advertisements may be targeted, for example based on the location of the user, the marker being scanned (e.g., which may be indicative of a product on which the code is disposed), and/or individual or group consumer behaviors. In some embodiments, the same marker (e.g. QR code) for a product may be used in different locations with one web site URL, but the data served up on the webpage may be different depending on the location of the marker reported, which in turn represents the location of the mobile device reported. For another example, based on the location of a marker being scanned, additional information may be shown about the product the marker is attached to. In addition, information about related products may also or instead be shown. Further, a game or other content may also be accessed based on the scanned marker and/or the location. In some embodiments, data such as location, product scanned, access time, frequency of access, and/or any other information may be collected in order to perform an analysis of consumer behavior. Such data may be collected in combination with or in the absence of transmitted advertisements or other information or content. Such data may be used by the marker agency (e.g., responsible for the marker agency server 106) and/or other entity, for example, determine how/when products are viewed or to gauge consumer interest or the effect of marketing or for any other reasons.

Figure 9:
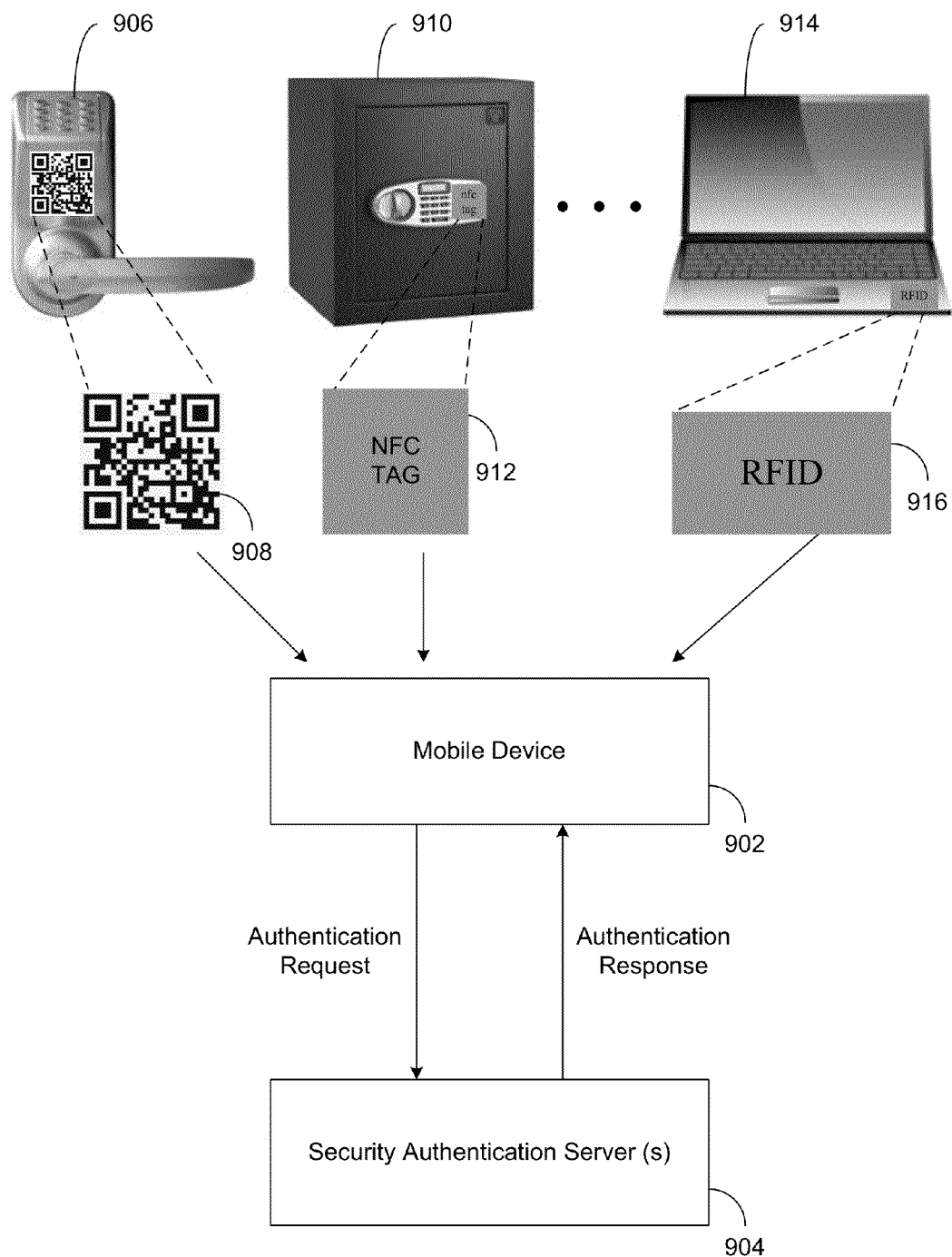
FIG. 9 illustrates a method of performing security authentication according to aspects of the present disclosure.

FIG. 9 illustrates a method of performing security authentication according to aspects of the present disclosure. In the exemplary application shown in FIG. 9, mobile device 902 may be configured to receive markers from different objects, such as QR code 908 from lock 906, NFC tag 912 from safe 910, and RFID tag 916 from computer 914. Similar to the example shown in FIG. 1, mobile device 902 may be configured to perform similar functions as mobile device 102 in a security authentication application; markers 908, 912, and 916 show different representations of marker 103 in such embodiments; and security authentication server 904 may be configured to function as the positioning assistance server 104 and/or the marker agency server 106 of FIG. 1. Upon determining the location of the mobile device 902 using the methods described above in association with FIG. 3 and/or FIG. 4, the mobile device may send an authentication request to security authentication server 904, and receive an authentication response from the authentication server 904. A user may then use the authentication response to gain access to the different secured devices, such as lock 906, safe 910, and computer 914. In the example shown in FIG. 9, the disclosed approach may be used to verify that a mobile phone user is actually in a claimed location. For example, a QR code may be affixed on the secured lock 906 or affixed beside a doorway. The secured door may be unlocked if the scanned QR code can be verified as being at the location of the door. In such embodiments, the QR code or other marker may include information or instructions configured to trigger the authentication request or procedure. In some embodiments, the location request or session described above with respect to FIGS. 3 and/or 4 is performed as part of the authentication request or procedure.

Note that at least the subsequent three paragraphs, FIGS. 3-7 and their corresponding descriptions provide means for determining information at the mobile device from a marker associated with an object; means for generating a location request in accordance with the determined information; means for communicating location information in response to the location request generated; means for processing the information to determine encoded data; means for generating a SET initiated location request in accordance with the encoded data; means for processing the information to retrieve encoded data; means for sending a location request SMS message to the SLP server in accordance with the encoded data; means for receiving SUPL messages from the SLP server via a Wireless Application Protocol (WAP) Push mechanism; means for receiving the SUPL messages from the SLP server via a short message service (SMS) mechanism; means for receiving assistance data from a SLP server to aid location calculation; and means for sending location information to the SLP server to aid location calculation. The subsequent three paragraphs, FIGS. 3-9 and their corresponding descriptions provide means for receiving targeted advertisements in response to a location of the mobile device obtained based at least in part on the location information; means for sending an authentication request to a security authentication server in response to a determined location of the mobile device; and means for receiving an authentication response from the security authentication server.

The methodologies and mobile device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, non-transitory computer-readable media can comprise RAM, ROM, EEPROM, CD-ROM or other optical disk storage, magnetic disk storage or other magnetic storage devices, or any other non-transitory medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. The non-transitory computer readable media may be used to implement memory 124 of mobile device 500 and/or memory 610 of server 600.

In addition to storage on computer readable medium, instructions and/or data may be provided as signals on transmission media included in a communication apparatus. For example, a communication apparatus may include a transceiver having signals indicative of instructions and data. The instructions and data are configured to cause at least one processor to implement the functions outlined in the claims.

That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method of communicating location of a mobile device, comprising:
   determining information, at the mobile device, from a marker associated with an object;
   generating a location request in accordance with the determined information, wherein generating a location request comprises processing the information from the marker to determine encoded data and generating a SET initiated location request in accordance with the encoded data;
   communicating location information in response to the location request generated;
   sending an authentication request to a security authentication server in response to a determined location of the mobile device, wherein the security authentication server verifies the mobile device being at the determined location; and
   receiving an authentication response from the security authentication server.

2. The method of claim 1, wherein the mobile device is a secure user plane location (SUPL) enabled terminal (SET).

3. The method of claim 1, wherein the marker comprises at least one of: radio frequency identification tag, near field communication tag, multi-dimensional bar code, and quick response code.

4. The method of claim 1, wherein the encoded data comprises:
   a code configured to initiate a SUPL session;
   an IP address of the SLP server to serve the SUPL session; or some combination thereof.

5. The method of claim 1, wherein the encoded data further comprises at least one of:
   a mode of location request to be used; and
   an IP address of a third party server to report location of the mobile device to.

6. The method of claim 1, wherein generating a location request further comprises:
   processing the information from the marker to retrieve encoded data; and
   sending a location request SMS message to a SUPL location platform (SLP) server in accordance with the encoded data.

7. The method of claim 6, further comprising at least one of:
   receiving SUPL messages from the SLP server via a Wireless Application Protocol (WAP) Push mechanism; and
   receiving the SUPL messages from the SLP server via a short message service (SMS) mechanism.

8. The method of claim 1, wherein communicating location information comprises at least one of:

receiving assistance data from a SLP server to aid location calculation; and sending location information to the SLP server to aid location calculation.

9. The method of claim 8, wherein the location information comprises at least one of:
   location information measured by the mobile device; and
   location information computed by the mobile device.

10. The method of claim 1, further comprising:
    receiving targeted advertisements in response to a location of the mobile device obtained based at least in part on the location information.

11. A mobile device, comprising:
    one or more control units including processing logic, the processing logic comprising:
    logic configured to determine information at the mobile device from a marker associated with an object;
    logic configured to generate a location request in accordance with the determined information, wherein logic configured to generate a location request comprises logic configured to process the information from the marker to determine encoded data and logic configured to generate a SET initiated location request in accordance with the encoded data;
    logic configured to communicate location information in response to the location request generated;
    logic configured to send an authentication request to a security authentication server in response to a determined location of the mobile device, wherein the security authentication server verifies the mobile device being at the determined location; and
    logic configured to receive an authentication response from the security authentication server.

12. The mobile device of claim 11 is a secure user plane location (SUPL) enabled terminal (SET).

13. The mobile device of claim 11, wherein the marker comprises at least one of: radio frequency identification tag, near field communication tag, multi-dimensional bar code, and quick response code.

14. The mobile device of claim 11, wherein the encoded data comprises:
    a code configured to initiate a SUPL session;
    an IP address of the SLP server to serve the SUPL session; or some combination thereof.

15. The mobile device of claim 11, wherein the encoded data further comprises at least one of:
    a mode of location request to be used; and
    an IP address of a third party server to report location of the mobile device to.

16. The mobile device of claim 11, wherein logic configured to generate a location request further comprises:
    logic configured to process the information from the marker to retrieve encoded data; and
    logic configured to send a location request SMS message to a SUPL location platform (SLP) server in accordance with the encoded data.

17. The mobile device of claim 16, further comprising at least one of:
    logic configured to receive SUPL messages from the SLP server via a Wireless Application Protocol (WAP) Push mechanism; and
    logic configured to receive the SUPL messages from the SLP server via a short message service (SMS) mechanism.

18. The mobile device of claim 11, wherein logic configured to communicate location information comprises at least one of:
    logic configured to receive assistance data from a SLP server to aid location calculation; and
    logic configured to send location information to the SLP server to aid location calculation.

19. The mobile device of claim 18, wherein the location information comprises at least one of:
    location information measured by the mobile device; and
    location information computed by the mobile device.

20. The mobile device of claim 11, further comprising:
    logic configured to receive targeted advertisements in response to a location of the mobile device obtained based at least in part on the location information.

21. A system for communicating location of a mobile device, comprising:
    means for determining information at the mobile device from a marker associated with an object;
    means for generating a location request in accordance with the determined information; wherein means for generating a location request comprises means for processing the information from the marker to determine encoded data and means for generating a SET initiated location request in accordance with the encoded data;
    means for communicating location information in response to the location request generated;
    means for sending an authentication request to a security authentication server in response to a determined location of the mobile device; and
    means for receiving an authentication response from the security authentication server.

22. The system of claim 21, wherein means for generating a location request further comprises:
    means for processing the information from the marker to retrieve encoded data; and
    means for sending a location request SMS message to a SUPL location platform (SLP) server in accordance with the encoded data.

23. The system of claim 22, further comprising at least one of:
    means for receiving SUPL messages from the SLP server via a Wireless Application Protocol (WAP) Push mechanism; and
    means for receiving the SUPL messages from the SLP server via a short message service (SMS) mechanism.

24. The system of claim 21, wherein means for communicating location information comprises at least one of:
    means for receiving assistance data from a SLP server to aid location calculation; and
    means for sending location information to the SLP server to aid location calculation.

25. The system of claim 21, further comprising:
    means for receiving targeted advertisements in response to a location of the mobile device obtained based at least in part on the location information.

26. A non-transitory medium storing instructions for execution by one or more computer systems, the instructions comprising:
    instructions for determining information at a mobile device from a marker associated with an object;
    instructions for generating a location request in accordance with the determined information, wherein instructions for generating a location request comprises instructions for processing the information from the marker to determine encoded data and instructions for generating a SET initiated location request in accordance with the encoded data;
    instructions for communicating location information in response to the location request generated;

instructions for sending an authentication request to a security authentication server in response to a determined location of the mobile device, wherein the security authentication server verifies the mobile device being at the determined location; and instructions for receiving an authentication response from the security authentication server.

* * * * *